Patented Dec. 21, 1926.

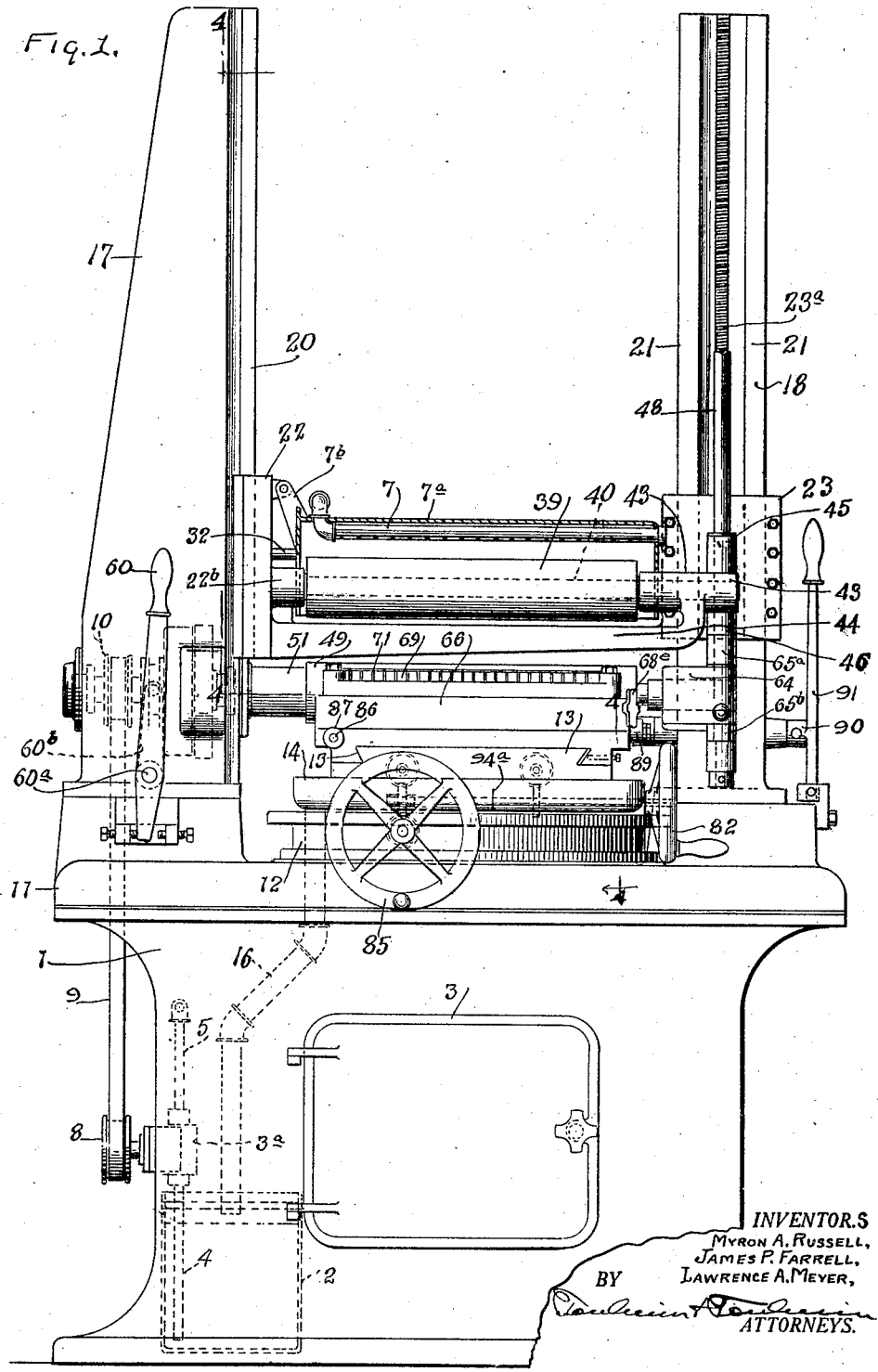

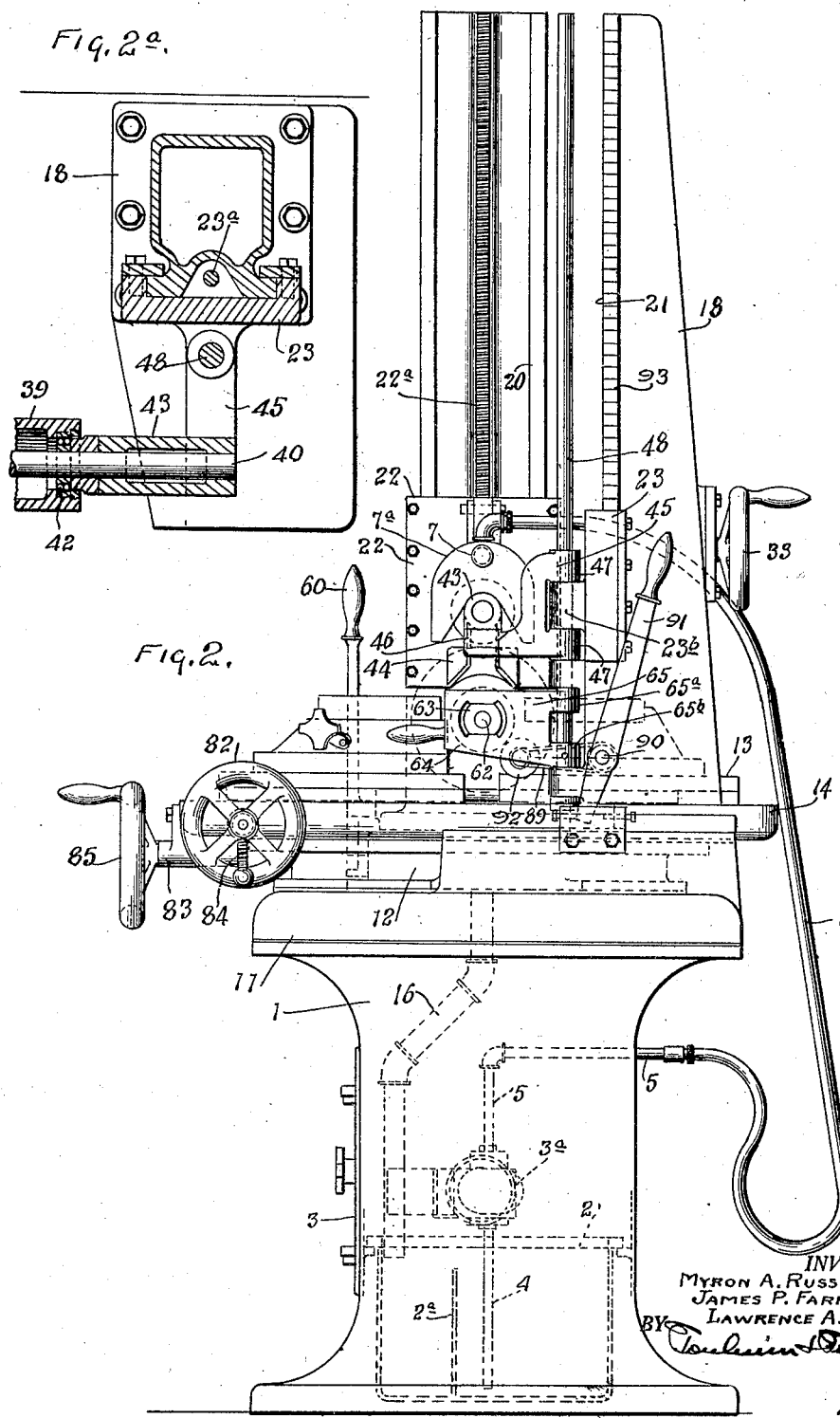

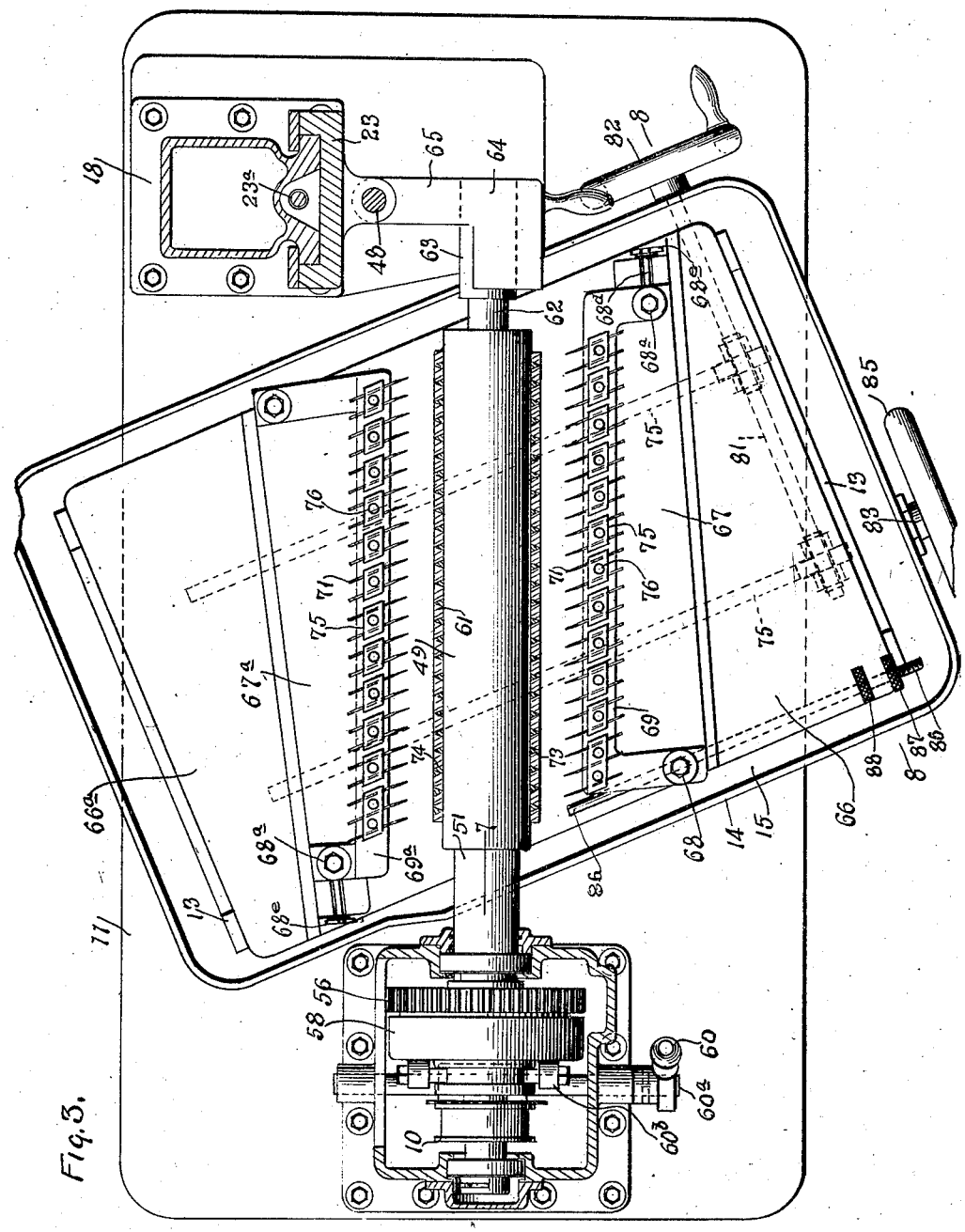

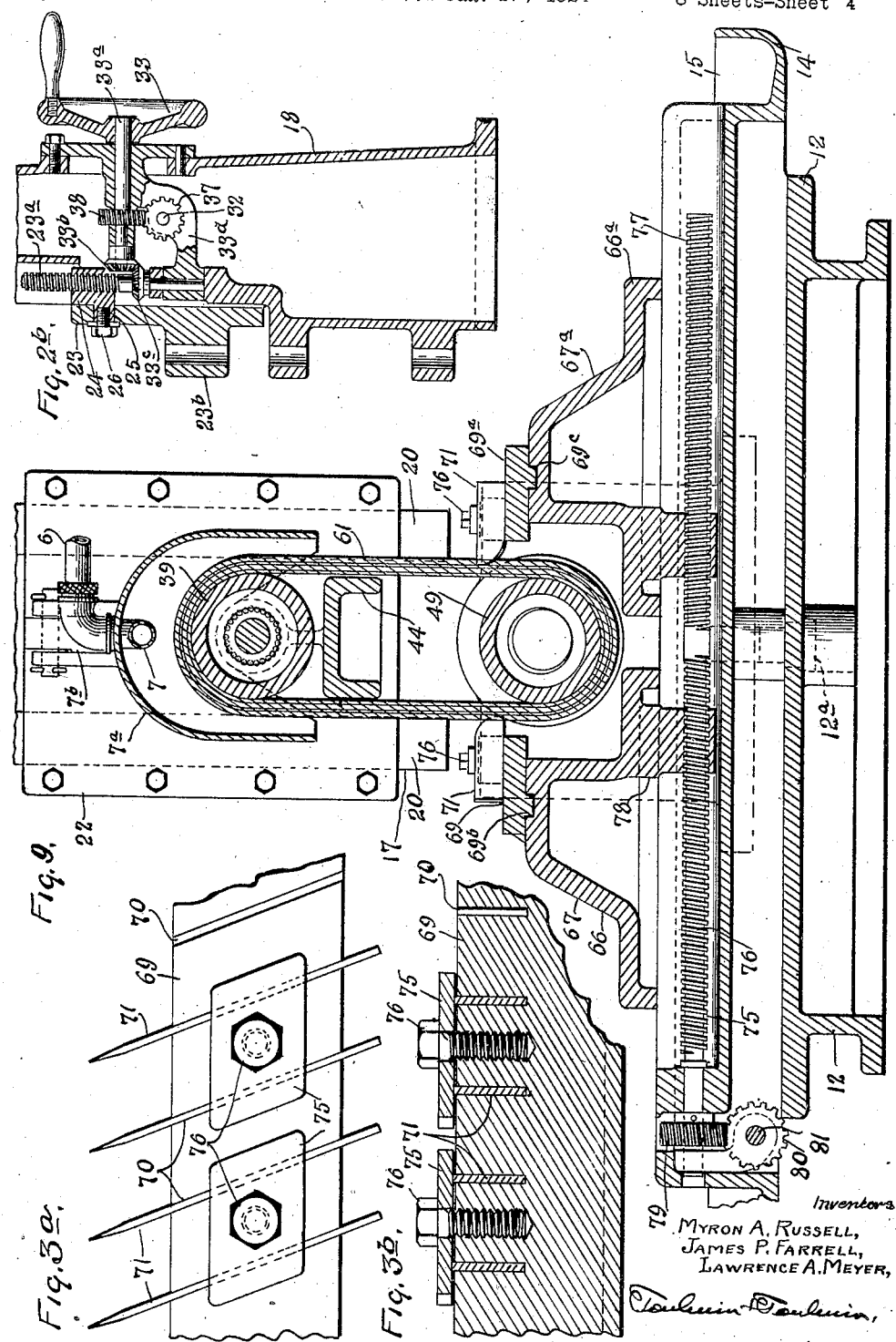

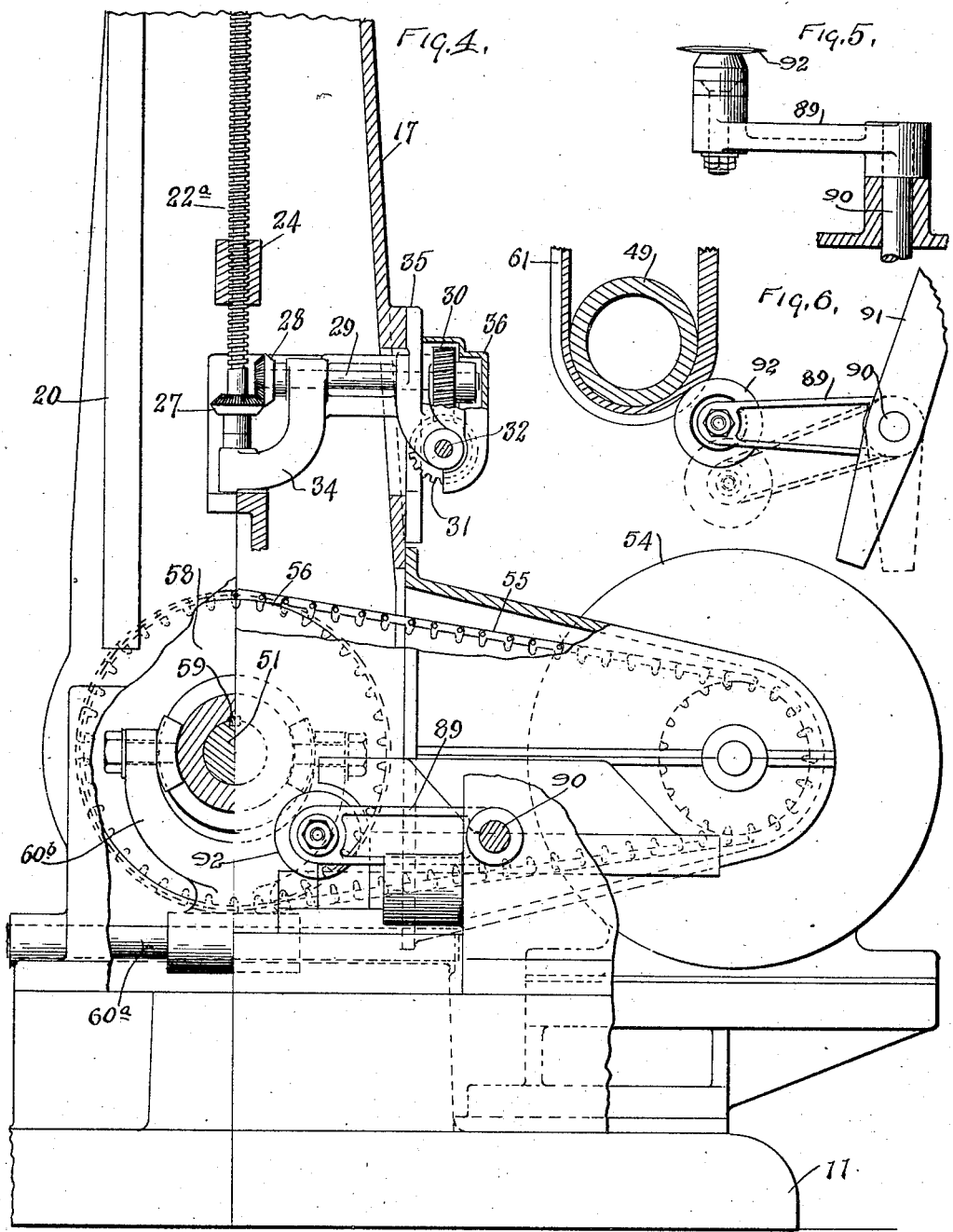

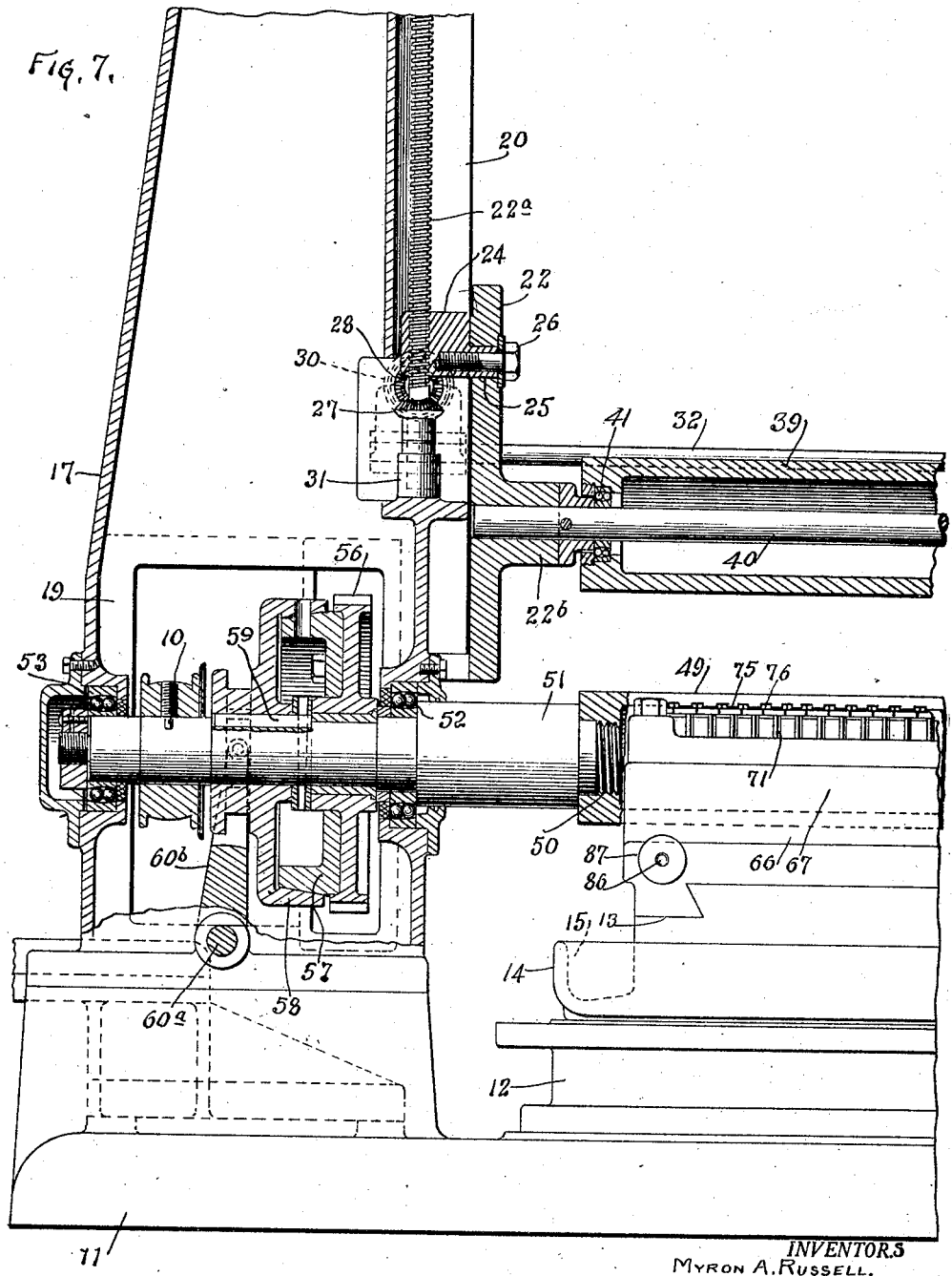

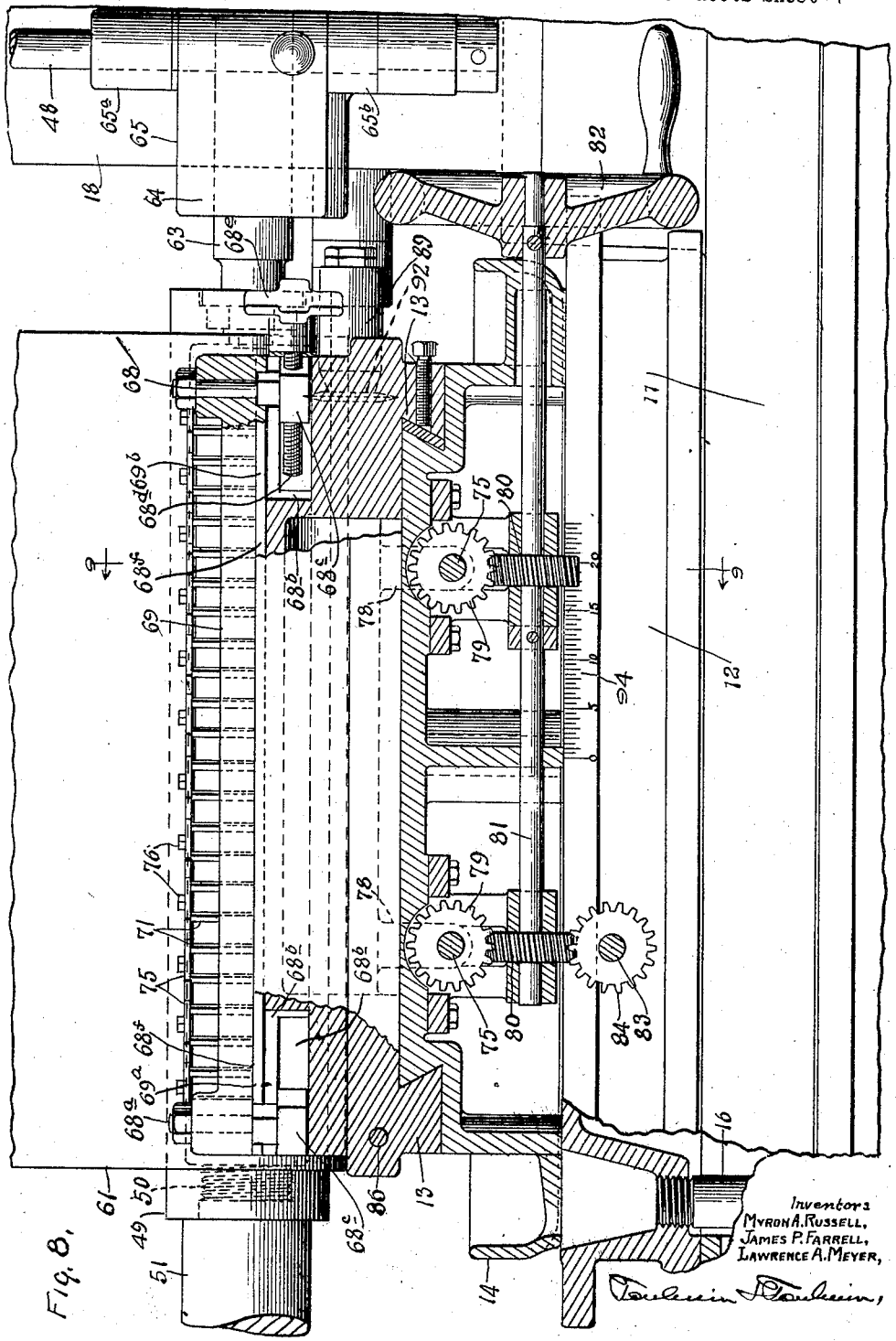

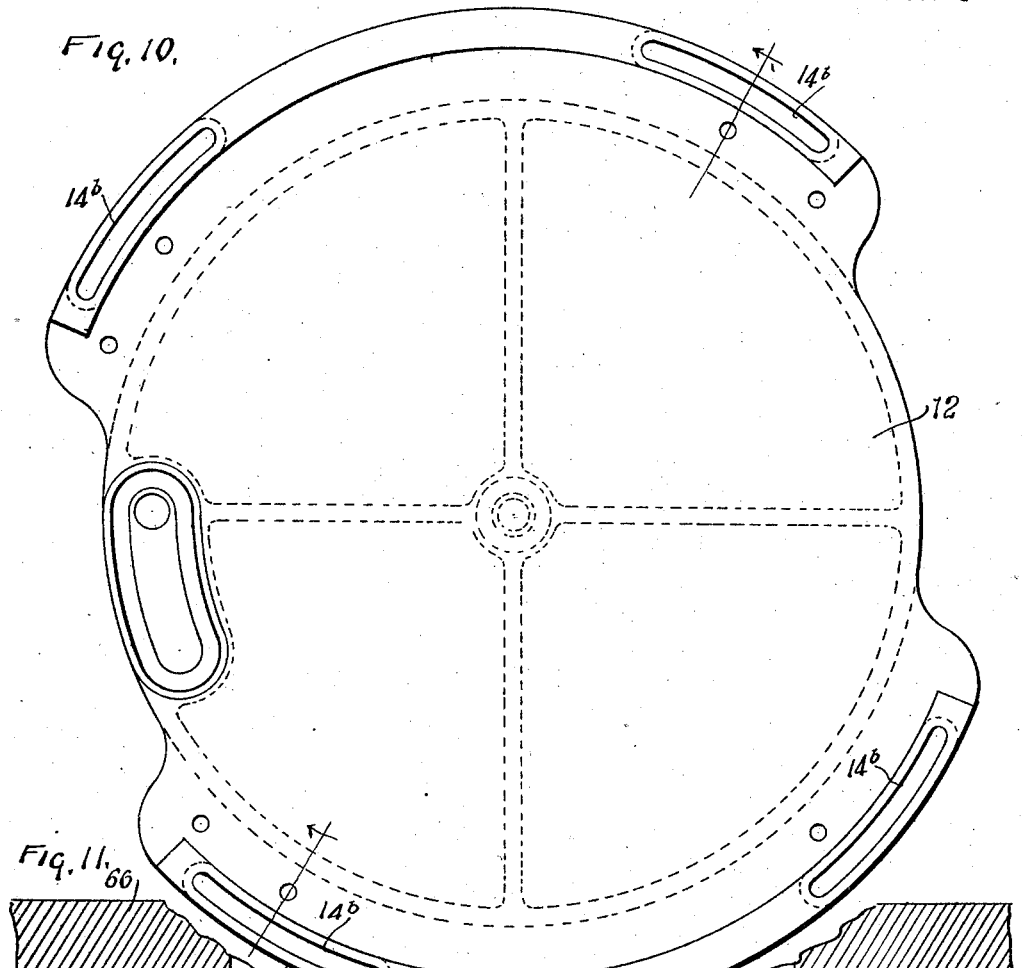
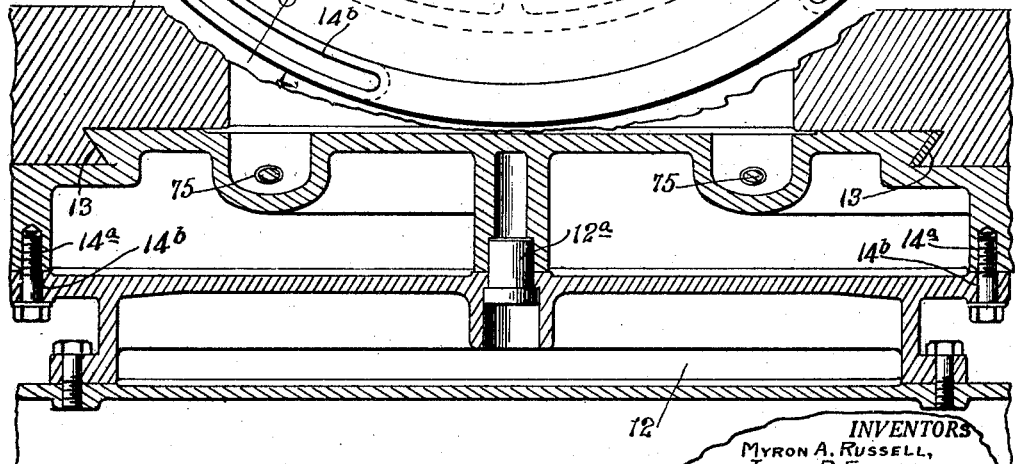

1,611,781

UNITED STATES PATENT OFFICE.

MYRON A. RUSSELL, JAMES P. FARRELL, AND LAWRENCE A. MEYER, OF DAYTON, OHIO, ASSIGNORS TO THE RUBBER DEVELOPMENT COMPANY, OF DAYTON, OHIO, A TRUST ESTATE.

BELT-CUTTING MACHINE.

Application filed January 17, 1924. Serial No. 686,740.

This invention relates to belt cutting machines.

The following are the principal objects in the invention:—

1. The provision of so mounting the supporting rollers on which an endless roll of belting material is cut, that they may be readily freed from their bearings at one end so as to permit the endless roll of belting material to be readily passed over the supporting rolls, when they can be quickly returned to their bearings.

2. Cutting the endless roll of belting material on both sides at the same time, one set of cutters at one angle of each belt and the other cutters at another angle of each belt, so that the two sets of cutters produce a series of complete belts.

Exactly 80 seconds are consumed in putting an endless roll of belting material in the machine, in cutting it into belts, and in taking the individual belts that resulted from the cutting, in this instance 24 belts, off of the rolls.

3. The adjustability of one of the roll supporting rollers to get the proper tension on the roll, whereby the knives will effectively act in cutting, also whereby, when the roll is put under various degrees of tension, the resulting belts will be more or less wider (in their normal state after being cut) than the distance between each two knives, due to the reaction of the rubber component in returning to normal position after the tension is released. Therefore, without adjusting the distance between the knives, belts of varying widths may nevertheless be produced by this tensioning of the roll while being cut.

4. To place the knives in such a position between the roll supporting rollers as to prevent the knives from coming in contact with the rollers during the cutting operation, the knives in such cases acting upon the material at points between the rollers.

This is of great importance in that it saves dulling and injuring the knives and saves also all injury to the supporting rollers, and avoids the necessity prevalent in old methods of recovering the supporting rollers after a few operations due to the knives having passed through the belt and cut the covering of the rollers, dulling the knives or injuring the rollers.

5. The provision of putting under tension the endless roll of belting by adjusting the supporting rollers to prevent it from slipping when the knives enter it in the cutting operation. In former machines when the belts were cut on what is known as the belt-forming drum (or the drum on which the belt was fabricated) there was difficulty in keeping the belt from slipping on such drum during the cutting operation. Much time was lost in preventing this slipping. In the present invention these objections are overcome.

6. The further provision of these supporting rollers upon which the endless roll of belting material is supported during the cutting operation instead of the old way of cutting the endless roll of belting material while on the forming drum on which it was fabricated. This old method delayed the return of the forming drums to the forming machine during the time required for the belting material to sufficiently set before it could be cut. Thus, numerous forming rolls were in effect idle so far as production was concerned during the period of the setting of the material before it was ready to be cut, but with the present machine these objections are all eliminated and the rolls are immediately returned to the fabricating machine undamaged by the cutting operation when the belting is removed. Thus also, the forming rolls are not subjected to the damage from the cutting knives which in the old way they constantly suffered, requiring them to be resurfaced frequently.

In the accompanying drawings, Fig. 1 is a front elevation of the machine embodying our invention.

Fig. 2 is a side elevation.

Fig. 2ª is a detail and plan showing the bearing arrangement for one end of the upper roller.

Fig. 2ᵇ is a detailed view showing the operating shaft and its gears for rotating one of the vertical screw threaded shafts.

Fig. 3 is a partial plan view and horizontal section.

Fig. 3ª is a detailed plan view of several knives and the devices for securing them to the cutter bar.

Fig. 3ᵇ is a longitudinal sectional view of the knife bar with some of the knives inserted and others removed.

Fig. 4 is a partial vertical section on the line 4—4 of Fig. 1, looking in the direction of the arrows.

Fig. 5 is a detailed view of the holding device for the belting material.

Fig. 6 is a side elevation of the holding device in active position against the belting material in full lines and inactive position in dotted lines.

Fig. 7 is a vertical enlarged sectional view on the line 7—7 of Fig. 3 and a partial elevation showing the base and the movable bed for carrying the knife bar.

Fig. 8 is a partial vertical sectional view on the line 8—8 of Fig. 3 and a partial front elevation of the machine.

Fig. 9 is a vertical sectional view taken on the line 9—9 of Fig. 8.

Fig. 10 is a plan view of the table upon which the knife-holding devices are mounted, showing the means whereby the table is held in different adjusted positions about its center.

Fig. 11 is a transverse vertical sectional view of the bed and this table, showing the same devices and the pivotal connection between the bed and table.

The numeral 1 designates the general base of our machine which is hollow for the accommodation of a water tank 2, accessible through a door 3. Connected with the tank is a pump $3^a$ of any convenient kind adapted to lift the water through a pipe 4 from the tank and force it into a pipe 5 which connects with a flexible hose 6, by which the water is delivered to a spray pipe 7 which spreads the water over the endless roll of belting material to facilitate the action of the knives in cutting the roll into individual belts, as will be hereinafter more fully explained. A hood $7^a$ held by an arm $7^b$ aids in properly directing the water.

The pump is driven by a pulley 8 through a belt 9 itself driven by a pulley 10 on the arbor or shaft which operates the lower supporting drum as will also presently be explained.

The base 1 has a top 11 on which is fitted a bed like part 12, the upper portion of which as shown at 13, is fashioned into stationary ways on which is mounted the cutting knives as will appear in detail later. A table 14 is formed with a trough 15 to receive the drippings of the water referred to above, whence they are delivered through a drip pipe 16 to the supply tank 2. It will be noticed from Fig. 2 that this tank has a partition $2^a$ between which and the adjacent wall of the tank a sort of sump is formed for the returned water, which is ladened more or less with chips of belting material, grease, etc., all of which settle in the bottom of the sump, so that only the upper part of the returned water will flow over the partition into the body of the tank.

At each side of the machine as shown in Fig. 1 we erect standards 17 and 18, the former at its base constituting a compartment 19 as seen best in Fig. 7, in which is located the driving mechanism for operating the arbor or shaft of the lower supporting roller. These standards 17 and 18 have formed on them ways 20 and 21, respectively.

On the ways 20, are mounted slides and on the ways 21 are mounted slides 23. These slides are adapted to be adjusted more or less up and down, the slide 22 by a screw threaded shaft $22^a$ and the slide 23 by a similar screw threaded shaft $23^a$.

The connection between the screw $22^a$ and the slide 22 is best seen in Fig. 7 where the nut 24 is shown threaded on the screw $22^a$ and connected by a lug 25 having a nut 26 screwed on its end to retain the slide 22. The shaft $22^a$ may, of course, be operated in any convenient way, but we prefer to rotate it by the miter pinion 27 mounted on the shaft $22^a$ driven by a miter pinion 28 carried on a shaft 29 (see Figs. 4 and 7), which latter shaft carries a worm pinion 30 operated by a like pinion 31 on the hand-operated shaft 32. The shaft 32 crosses to the other side of the machine and has a handwheel 33 as best seen in Figs. 2 and $2^b$.

Referring again to Fig. 4, it will be seen that the lower end of the threaded shaft $22^a$ is fitted in a bracket 34 whose upper end carries one end of the shaft 29, the other end of which is mounted in a bracket 35. A cap 36 encloses the worm pinions 30 and 31. So much for the means by which the slide 22 is adjusted up and down to vary the position of one end of the upper supporting roller with respect to the lower supporting roller.

The other end of this supporting roller is adjusted up and down by the other slide 23. See Fig. $2^b$ where it will be observed that the shaft 32 has a worm pinion 37 which meshes with a similar pinion 38 on the shaft $33^a$, this shaft being rotated by the hand wheel 33 which carries the bevel pinion $33^b$ meshing with the bevel pinion $33^c$ carried by the shaft $23^a$. This rotation of the shaft $23^a$ operates the other end of the roller 39 and the slide 23 adjusted up and down by the same manipulation of the shaft 32 that adjusts the other slide 22. A bracket $33^d$ supports the lower end of the shaft $23^a$, carries the shaft 32 and the shaft $33^a$ and is secured to the casting 18 by any suitable means. The connection between the slide 23 and the threaded shaft $23^a$ being like the connection between the slide 22 and the threaded shaft $22^a$, it is unnecessary to illustrate the former or describe it in further detail.

We shall now refer to the manner of mounting the upper supporting roller 39 in relation to the slides 22 and 23 (see Fig.

7). The slide 22 forms a bearing 22ᵇ in which is fitted a stationary shaft 40 which carries a ball bearing 41 on which that end of the roller 39 is mounted.

For the other end of the shaft 40 and the roller 39 see Fig. 2ᵃ where it will be seen that a ball bearing 42 is carried by the shaft and the roller mounted on it. It will also be seen that a bearing 43 is provided for that end of the shaft 40 and is sustained, as best seen in Fig. 1, by an arm 44 extended rigidly from the slide 22. In order to steady this bearing 43 and prevent vibration, a bracket 45 is mounted on the slide 23 and extended out and under the bearing 43 to support it as indicated at 46 in Figs. 2, 2ᵃ and 1. This bracket is mounted to swing away from the bearing 43 by means of its pivotal connection 47 with a rod 48 which extends through the bracket and the lug 23ᵇ as clearly shown in Figs. 1 and 2. The primary purpose of swinging the bracket 45 away from the bearing 43 is to permit the endless roll of belting material, to be presently referred to, to be slipped over the supporting roller 39. The capacity of the two supporting rollers to receive upon them this endless roll of material and to have removed from them the numerous belts into which the roll is cut, is a prime feature of our invention, and may be carried into effect in various ways—all within this principle or capacity of the supporting rollers.

Referring now to the manner of mounting the other or lower supporting roller 49, attention is directed particularly to Figs. 2, 3 and 7. One end of this roller receives the screw threaded projection 50 of a stud shaft 51 mounted in roller bearings 52 and 53 carried by the standard 17. This shaft is rotated through an electric motor 54, see Fig. 4, or by other suitable means through a drive chain 55 which is mounted on a sprocket wheel 56, see Fig. 7, loosely mounted on the shaft 51 and equipped with one member 57 of a friction clutch. This sprocket revolves freely on the shaft but is clutched thereto through the action of this clutch whose other member is designated at 58 and is splined to the shaft by a key 59. A hand lever 60, see Fig. 1, is adapted to shift the member 58 of the clutch, so that it will engage with or disengage from the member 57, and thereby cause the shaft 51 to be revolved or to stand idle. We have before referred to the belt pulley 10 whose function is to operate the pump through the belt 9. Lever 60 rocks shaft 60ᵃ which operates a yoke 60ᵇ, which has shoes that engage a groove in the member 58.

The lower supporting roller, designated 49 is the roller which is positively rotated, the roller 39 merely travelling with the endless roll of belting which is positively driven by the roller 49. By reference to Fig. 9, the endless roll of belting will be seen being designated 61.

Thus by the adjustment of the upper roller 39 with respect to the position of the lower roller the belting material is put under proper tension, while the rotation of the lower roller causes the belting to travel against the knives by which it is to be severed into separate belts as will presently appear.

Referring to the other end of the lower supporting roller, 49, and the manner of mounting it, attention is called to Fig. 2 and Fig. 3, particularly the latter, where it will be seen that a stud shaft 62 carries a block 63 adapted to rest within the jaws 64 of a bracket 65 connected with the slide 23, by being pivoted on the rod 48 carried by the slide. This bracket, as seen in Fig. 2 has a lug 65ᵃ and a similar lug 65ᵇ which fit upon the rod 48 and give vertical rigidity to the bracket.

These parts are sufficiently tight as to cause the bracket 65 to maintain its normal position in sustaining its end of the roller 49, but it yet capable of being swung laterally to permit the endless roll of belting to be slipped over the supporting roller 49 at the time it is slipped over the corresponding end of the other supporting roller, 39.

We shall now refer to the instrumentalities employed in severing the roll of belting material into individual endless belts. This part of our machine is composed of the movable plates 66 and 66ᵃ mounted on the ways 13 as seen in Figs. 1, 7 and 9 particularly. The plates have elevated portions 67 and 67ᵃ upon which are secured by bolts 68 and 68ᵃ the knife holding bars 69 and 69ᵃ as seen in Figs. 3 and 9. These bars 69 and 69ᵃ have oblique slots 70 therein for the reception of the knife blades 71 of which there are two series, the blades of each series being spaced apart a distance equal to the width of what will be the outer face of the belt. By looking at Fig. 3 it will be seen that when these knives are advanced against the endless roll of belting material indicated at 61, one series will cut oblique incisions 73 and the other series will cut oblique incisions 74. One set of incisions is cut by one set of knives and the other set of incisions by the other set of knives, and both sets cut at the same time on opposite sides of the roll of belting material.

In order to secure the knives in place they are fitted in these slots 70 and are held down by caps 75 secured by screws 76 as shown particularly in Figs. 3ᵃ and 3ᵇ.

We shall now refer to one form of means for adjusting these knives to and from the roll of belting material and for holding them in adjusted positions. These means consist of operating shafts 75 having each right hand threads 76 and left hand threads 77, the former to engage the lugs 78 of the slide 66 and the latter to engage the lug 78ª of the slide 66ª when the shafts are rotated. For that purpose the shafts 75 have each a worm pinion 79, each of which meshes with a worm pinion 80 both mounted on the hand-operated shaft 81 carrying the hand wheel 82, as best seen in Fig. 8.

In order to enable the operator to use both hands or to have a hand operated shaft near him, no matter whether he is standing at the front of the machine nearest the right hand or nearest the left hand side, see Fig. 3, we provide a second hand-operated shaft 83 having a worm pinion 84 which meshes with one of the worm pinions 80 and which carries a hand wheel 85. See Figs. 3 and 8.

It will now be seen that by manipulation, either or both, of the handwheels 82 and 85, the operator will adjust the knives to and from the roll of belting 61 and cut it into a number of separate and individual belts whose cross sections are indicated between the incision lines 73 and 74 in Fig. 3.

In order to keep the knives out of contact with the rolls 39 and 49, or either of them, they are positioned as seen in Fig. 9, so that they attack the roll of belting at an elevation where it is out of contact with the rollers, so that they may cut through the material without reaching the surfaces of the rollers, particularly the lower roller to which they are nearest.

In order to prevent the knives being accidentally adjusted against the lower roller, a stop device is attached to the slide 66. It consists of a rod 86 threaded near one end and operated by a thumb nut 87 and locked by nut 88 as indicated in Fig. 3. The inner end of this stop rod will contact with the surface of the roller 49 before the blades of either series can reach the roller.

We shall now refer to the means for preventing the endless roll of belting material from traveling lengthwise on the rollers 39 and 49. (See Figs. 2, 4, 5 and 6.) It consists of an arm 89 pivoted at 90 and operable by a lever 91 to engage a sharpened disc 92 with the roll of belting material sufficiently deep to prevent it from endwise movement, which it sometimes tends incidentally to do, as it is rotated by the lower roller. This disc being located near the marginal edge of the material, no appreciable amount of material is injured. It is found that this device is very effective in preventing the material from shifting laterally either way as the disc 92 impinges deeply enough into that material.

In order to determine the distance between the rolls 39 and 49, we preferably provide a scale 93 on the standard 18 which is read in connection with the slide 23 to indicate the position to which it is adjusted. This scale in practice is suitably marked with numerals.

A further scale 94 (see Fig. 8) is used for the purpose of determining the angle or degrees of angle of the knives to the endless roll of belting material. To this end the table 14 is pivotally mounted on the bed 12 by the pivot bolt 12ª shown best in Figs. 9 and 11. As the plates 66 and 66ª are mounted on this table and the knife-holding bars 69 and 69ª are mounted, respectively, on the plates 66 and 66ª, it will be seen that by partially rotating the table 14 in one direction or the other, the angularity of the cutting blades with respect to the material to be cut will be adjusted, so that the resulting angle of the sides of individual belts can be varied according to the requirements.

By reference to Figs. 10 and 11 it will be seen that the table 14 and bed 12 are held in any adjusted relative position by bolts 14ª fitted in slots 14ᵇ. Therefore, the table and bed can be clamped together after the adjustment has been made and the degree of angle of the knives to the belting material can be determined by reference to the scale 94 which appears on the adjoining margin of the bed 12 and is read in connection with an indicating line 94ª on the table 14.

To facilitate the adjustment of knife-holding bars 69 and 69ª to different positions laterally on the plates 66 and 66ª, we slot these plates as shown at 69ᵇ and 69ᶜ in Figs. 8 and 9. At one end of the plates we also recess them as shown at 68ᵇ to accommodate the enlargements 68ᶜ of the bolts 68 and 68ª so as to adjust such bolts laterally through the action of a screw 68ᵈ operated by a thumb piece 68ᵉ, as clearly shown in Fig. 8. By adjusting the bolts 68 and 68ª in this manner the knife bars 69 and 69ª are adjusted laterally so as to properly position each series of knives with respect to the endless roll of material, whereby the knives will be made to enter the material at the exact point desired.

Splines 68ᶠ on the knife bars 69 and 69ª fit in grooves 69ᵇ and 69ᶜ in the plate 66 to guide the knife bars when adjusted as above stated. See Figs. 8 and 9.

Having thus fully described our invention, what we claim as new is:—

1. In a machine of the character described, the combination with a general frame, of a pair of supporting rollers, means to vary the distance between them, means to rotate one of them, and bearings for one end of each roller each adapted to be moved away from the roller mounted therein to admit of the placing of an endless roll of material over one end of each roller.

2. In a machine of the character described, the combination with a general frame, of a pair of supporting rollers, slides mounted on the frame and having bearings for one of the rollers to vary the distance between the two rollers, and other bearings for the other roller, driving means for the latter, and brackets adapted to engage the journals at one end of the rolls and to disengage them to permit of slipping over the rollers an endless roll of belting material.

3. In a machine of the character described, the combination with a general frame, of supporting rollers adapted to have one end of each freed from its bearing to admit of placing an endless roll of belting material over both rollers and to keep such roll taut and to give rotary movement thereto, and a series of knives adapted to be advanced through the material to sever it into a series of independent endless belts, said freeing of the rollers from their bearings also permitting of the removal from the rollers of the severed endless belts formed from said roll.

4. In a machine of the character described, the combination with a general frame, of supporting rollers, means to rotate one of them, means to vary the distance between them, means to admit of passing over them an endless roll of belting material comprising bearings for one end of each roller adapted to be moved away from the rollers, knives adapted to be presented to the material to sever it into individual belts, means to supply water to the material to facilitate the action of the knives.

5. In a machine of the character described, the combination with a general frame, of supporting rollers adapted to receive, keep taut and cause to travel an endless roll of belting material, and knives adapted to be presented to such material at points between the supporting rollers so as to sever it into individual belts without attacking the rollers.

6. In a machine of the character described, the combination with a general frame, of supporting rollers adapted to receive, put under tension and cause to travel, an endless roll of belting material, and two sets of knives each adapted to be presented against said material at points between the rollers to sever the material into individual belts, the material being engaged by the knives simultaneously upon opposite sides.

7. In a machine of the character described, the combination with a general frame, having ways, of slides mounted on said ways, a set of knives mounted on each slide, and means to operate the slides to cause the sets of knives to be adjusted toward and from each other, and means to cause an endless roll of belting material to travel between the two sets of knives, one side of the material engaging one set of knives and the other side the other set of knives to sever the material into individual belts.

8. In a machine of the character described, the combination with a plate, having lateral slots and recesses, of a knife-holding bar, bolts extending through the bar and the slots and into the recesses, the head of one of said bolts being threaded, and an adjusting screw operable to adjust such bolt laterally and thereby adjust the position of the bar on the plate.

9. In a machine of the character described, the combination with slides, and an arm carried by one of them, such slide and arm having bearings, of a bracket carried by the other slide and adapted to sustain and release the bearing carried by the arm and a roller supported by said bearings.

In testimony whereof, we affix our signatures.

MYRON A. RUSSELL.
JAMES P. FARRELL.
LAWRENCE A. MEYER.